United States Patent
Giladi et al.

(10) Patent No.: US 12,015,783 B2
(45) Date of Patent: Jun. 18, 2024

(54) METHODS AND SYSTEMS FOR IMPROVED CONTENT ENCODING

(71) Applicant: Comcast Cable Communications, LLC, Philadelphia, PA (US)

(72) Inventors: Alexander Giladi, Denver, CO (US); Dan Grois, Beer-Sheva (IL); Yasser Syed, Philadelphia, PA (US); Ali C. Begen, Konya (TR)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

(21) Appl. No.: 17/550,792

(22) Filed: Dec. 14, 2021

(65) Prior Publication Data

US 2022/0191508 A1 Jun. 16, 2022

Related U.S. Application Data

(60) Provisional application No. 63/125,166, filed on Dec. 14, 2020.

(51) Int. Cl.
*H04N 19/147* (2014.01)
*H04N 19/159* (2014.01)
(Continued)

(52) U.S. Cl.
CPC ......... *H04N 19/147* (2014.11); *H04N 19/159* (2014.11); *H04N 19/172* (2014.11); *H04N 19/177* (2014.11); *H04N 19/52* (2014.11)

(58) Field of Classification Search
CPC .. H04N 19/147; H04N 19/159; H04N 19/172; H04N 19/177; H04N 19/52; H04N 19/59; H04N 19/132; H04N 19/156
See application file for complete search history.

(56) References Cited

U.S. PATENT DOCUMENTS

| 10,958,947 B1 * | 3/2021 | Wei | H04N 21/236 |
| 2011/0096828 A1 * | 4/2011 | Chen | H04N 21/8456 |
| | | | 375/E7.126 |

(Continued)

FOREIGN PATENT DOCUMENTS

| CN | 103891303 A | * | 6/2014 | | G06F 3/14 |
| CN | 113841395 A | * | 12/2021 | | H04N 19/117 |

(Continued)

OTHER PUBLICATIONS

Wikipedia, "x264," https://en.wikipedia.org/wiki/X264, accessed on Mar. 24, 2022.

(Continued)

*Primary Examiner* — Dramos Kalapodas

(74) *Attorney, Agent, or Firm* — Ballard Spahr LLP

(57) ABSTRACT

Methods and systems for improved content encoding are described herein. An encoder may allocate a time budget for encoding each frame of a content item. When the encoder takes longer than the allocated time budget to encode at least a portion of a given frame(s) of the content item at a first resolution, the encoder may take a number of actions in order to allow the encoder to "catch up," such as encoding frames at a second resolution. Once the encoder catches up and the allocated time budget is not being exceeded, the encoder may resume encoding frames of the content item at the first resolution.

20 Claims, 8 Drawing Sheets

(51) Int. Cl.
*H04N 19/172* (2014.01)
*H04N 19/177* (2014.01)
*H04N 19/52* (2014.01)

(56) References Cited

U.S. PATENT DOCUMENTS

| | | | | |
|---|---|---|---|---|
| 2014/0153640 | A1* | 6/2014 | Zhao | H04N 19/112 375/240.03 |
| 2014/0307771 | A1* | 10/2014 | Hemmendorff | H04N 19/103 375/240.02 |
| 2020/0014963 | A1* | 1/2020 | Gogoi | H04N 21/6583 |
| 2020/0404297 | A1* | 12/2020 | Sarwer | H04N 19/105 |
| 2022/0248061 | A1* | 8/2022 | Zhang | H04N 19/139 |

FOREIGN PATENT DOCUMENTS

| | | | | |
|---|---|---|---|---|
| EP | 4075807 A1 * | 10/2022 | | H04N 19/132 |
| WO | WO-2009075766 A2 * | 6/2009 | | H04L 47/25 |

OTHER PUBLICATIONS

Code, http://komisar.gin.by/x.patch/BugMaster/20100521/05_x264_speedcontrol.r1602.diff, accessed Mar. 24, 2022.
Anonymous: "High CPU Usage/High Encoding/Taking too long to encode? Read this first!" OBS Forums, Jan. 6, 2015, pp. 1-5, XP055916136, Retrieved from the Internet: https://obsproject.com/forum/threads/high-cpu-usage-high-encoding-taking-too-long-to-encode-read-this-first.23334/ [retrieved on Apr. 28, 2022].
Extended European Search Report issued in related application No. EP 21214299.6 dated May 13, 2022 (9 pages).

* cited by examiner

METHODS AND SYSTEMS FOR IMPROVED CONTENT ENCODING

CROSS-REFERENCE TO RELATED PATENT APPLICATION

This application claims priority to U.S. Provisional Application No. 63/125,166, which was filed on Dec. 14, 2020, and is incorporated by reference in its entirety herein.

BACKGROUND

Many encoders within content delivery networks, such as real-time video encoders, allocate a time budget (e.g., a "millisecond budget") for encoding each frame of video. In the event that encoding a given frame(s) —or a portion thereof—takes longer than the allocated time budget, an encoder may "fall behind." This may result in the encoder being unable to deliver frames to a packager at the proper time (e.g., when requested/expected by the packager). Some existing solutions include maintaining a pre-encoder queue of frames. Other existing solutions focus on reducing computational complexity. These and other considerations are discussed herein.

SUMMARY

It is to be understood that both the following general description and the following detailed description are exemplary and explanatory only and are not restrictive. Methods and systems for improved content encoding are described herein. For example, an encoder may allocate a time budget for encoding each frame of a content item. When the encoder takes longer than the allocated time budget to encode a portion(s) of a given frame(s) of the content item at a first resolution, the encoder may begin to encode frames of the content item—or portions thereof—at a second resolution (e.g., a lower resolution/bitrate) in order to allow the encoder to "catch up."

As another example, when the encoder takes longer than the allocated time budget to encode a portion(s) of a frame(s) for a representation of the content item at a first resolution, the encoder may use reference picture resampling (RPR) when encoding further frames—or portions thereof—for the first representation. RPR may allow the encoder to "reuse" encoding decisions for corresponding frames that were previously encoded for a representation at a second resolution (e.g., a lower resolution as compared to the first resolution). The encoding decisions that may be reused may be associated with motion estimation, partitioning, intra prediction, a combination thereof, and/or the like.

As a further example, when the encoder takes longer than the allocated time budget to encode a portion(s) of a given frame(s) of a content item at a first resolution using a first plurality of encoding algorithms, the encoder may begin to encode frames of the content item—or portions thereof—at a second resolution (e.g., a lower resolution/bitrate) using a second plurality of encoding algorithms in order to allow the encoder to "catch up." The second plurality of encoding algorithms, as compared to the first plurality of encoding algorithms, may require less computational demand. Once the encoder catches up (e.g., the time budget is no longer being exceeded), the encoder may resume encoding at the first resolution and/or using the first plurality of encoding algorithms. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, together with the description, serve to explain the principles of the present methods and systems.

DETAILED DESCRIPTION

Figure 1:
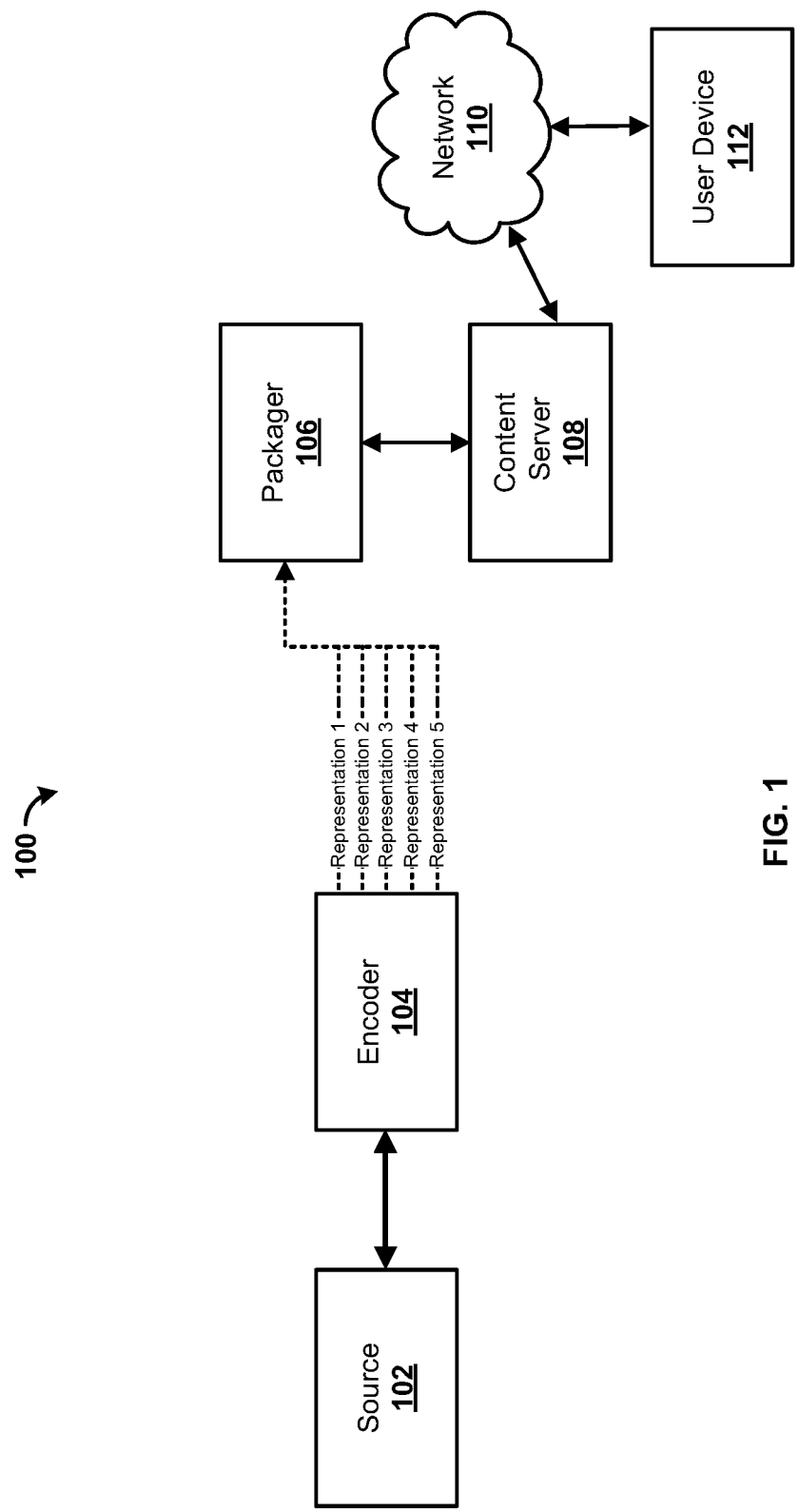
FIG. 1 shows an example system.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. When values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude other components, integers, or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application, reference is made to block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general-purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

"Content items," as the phrase is used herein, may also be referred to as "content," "content data," "content information," "content asset," "multimedia asset data file," or simply "data" or "information". Content items may be any information or data that may be licensed to one or more individuals (or other entities, such as business or group). Content may be electronic representations of video, audio, text, and/or graphics, which may be but is not limited to electronic representations of videos, movies, or other multimedia, which may be but is not limited to data files adhering to H.264/MPEG-AVC, H.265/MPEG-HEVC, H.266/MPEG-VVC, MPEG-5 EVC, MPEG-5 LCEVC, AV1, MPEG2, MPEG, MPEG4 UHD, SDR, HDR, 4 k, Adobe® Flash® Video (.FLV), ITU-T H.261, ITU-T H.262 (MPEG-2 video), ITU-T H.263, ITU-T H.264 (MPEG-4 AVC), ITU-T H.265 (MPEG HEVC), ITU-T H.266 (MPEG VVC) or some other video file format, whether such format is presently known or developed in the future. The content items described herein may be electronic representations of music, spoken words, or other audio, which may be but is not limited to data files adhering to MPEG-1 audio, MPEG-2 audio, MPEG-2 and MPEG-4 advanced audio coding, MPEG-H, AC-3 (Dolby Digital), E-AC-3 (Dolby Digital Plus), AC-4, Dolby Atmos®, DTS®, and/or any other format configured to store electronic audio, whether such format is presently known or developed in the future. Content items may be any combination of the above-described formats.

"Consuming content" or the "consumption of content," as those phrases are used herein, may also be referred to as "accessing" content, "providing" content, "viewing" content, "listening" to content, "rendering" content, or "playing" content, among other things. In some cases, the particular term utilized may be dependent on the context in which it is used. Consuming video may also be referred to as viewing or playing the video. Consuming audio may also be referred to as listening to or playing the audio. This detailed description may refer to a given entity performing some action. It should be understood that this language may in some cases mean that a system (e.g., a computer) owned and/or controlled by the given entity is actually performing the action.

Provided herein are methods and systems for improved content encoding. Encoded frames—or portions thereof—of a content item may be packaged and delivered within a content delivery network as fragments (e.g., segments). Each fragment of a content item may comprise one or more groups of pictures (GOP). Some encoding and compression standards, such as the High Efficiency Video Coding (HEVC) and Advanced Video Coding (AVC) standards, allow resolution changes at a "closed" GOP level, and sequence parameter set network abstraction layer units (SPS NAL units) are inserted in front of certain frames (e.g., an IDR frame) to indicate a different resolution. Other encoding and compression standards, such as the Versatile Video Coding (VVC) compression standard, allow reference picture resampling (RPR). RPR may allow frames/pictures—or portions thereof—within a GOP for a first resolution to be referenced by GOPs for other resolutions. As another example, RPR may allow a reference frame from a lower layer—or portions thereof—to be used to encode a frame—or a portion thereof—for a higher layer. As a further example, RPR may include inter-layer prediction to encode a higher-layer reference frame—or a portion thereof—based on a lower-layer reference frame—or a portion thereof. RPR may therefore allow an encoder to encode frames—or portions thereof—of a content item using less computational resources, since encoding decisions (e.g., encoding parameters) for a first frame—or portions thereof—at a first resolution are able to be "reused" when encoding another frame—or portions thereof—at another resolution.

The present methods and systems may adjust an encoding level (e.g., a bitrate/resolution) in order to improve content encoding and delivery. For example, an encoder of a content delivery network, such as a real-time video encoder, may allocate a time budget (e.g., a "millisecond budget") for encoding each frame—or portions thereof—of a content item (e.g., a video). When the encoder takes longer than the allocated time budget to encode a portion(s) of a given frame(s) of the content item at a first resolution, the encoder may "fall behind" and become unable to deliver frames to a packager at a proper time (e.g., when requested/expected by the packager).

To prevent such a scenario, or to mitigate the effects of falling behind, the encoder may begin to encode frames—or portions thereof—of the content item at a second resolution (e.g., a lower resolution/bitrate) in order to allow the encoder to "catch up." The encoder may begin encoding the frames—or portions thereof—at the second resolution at a GOP level, at a layer level, and/or at a single picture level. Once the encoder catches up (e.g., the time budget is no longer being exceeded), the encoder may resume encoding the content item at the first resolution.

The present methods and systems may utilize RPR to improve content encoding and delivery. Frames of a content item may be encoded at multiple resolutions simultaneously. For example, the encoder may encode frames of the content item for a number of representations, and each representation may be associated with a different resolution. The encoded frames for each representation may be stored as a single binary (e.g., within a single storage file/structure).

When the encoder takes longer than the allocated time budget to encode a portion(s) of a frame(s) of the content item for a representation at a first resolution, the encoder may use RPR when encoding further frames—or portions thereof—for the first representation. For example, RPR may allow the encoder to "reuse" encoding decisions for corresponding frames—or portions thereof—that were previously encoded for a representation at a second resolution (e.g., a lower resolution as compared to the first resolution). The encoding decisions that may be reused may be associated with motion estimation, partitioning, intra prediction, a combination thereof, and/or the like.

The encoder may use RPR when the further frames to be encoded for the first representation and the corresponding frames previously encoded for the second representation share one or more encoding characteristics. For example, the encoder may use RPR when the further frames to be encoded for the first representation are a same frame type as the corresponding frames previously encoded for the second representation. As another example, the encoder may use RPR when the further frames to be encoded for the first representation are associated with a same reference frame(s) as the corresponding frames previously encoded for the second representation. As a further example, the encoder may use RPR when the further frames to be encoded for the first representation are associated with a same downsampling filter(s) as the corresponding frames previously encoded for the second representation. Once the encoder catches up (e.g., the time budget is no longer being exceeded), the encoder may resume encoding frames for the first representation at the first resolution.

As a further example, the present methods and systems may improve content encoding and delivery by adjusting an encoding level and reducing computational complexity. For example, when the encoder takes longer than the allocated time budget to encode a portion(s) of a given frame(s) of a content item at a first resolution using a first plurality of encoding algorithms, the encoder may begin to encode frames—or portions thereof—of the content item at a second resolution (e.g., a lower resolution/bitrate) using a second plurality of encoding algorithms in order to allow the encoder to "catch up." The encoder may begin encoding at the second resolution using the second plurality of encoding algorithms at a GOP level, at a layer level, and/or at a single picture level. The second plurality of encoding algorithms, as compared to the first plurality of encoding algorithms, may require less computational demand. For example, the second plurality of encoding algorithms, as compared to the first plurality of encoding algorithms, may use a lesser number reference frames. As another example, the second plurality of encoding algorithms, as compared to the first plurality of encoding algorithms, may perform a lesser number of rate-distortion optimizations. As a further example, the second plurality of encoding algorithms, as compared to the first plurality of encoding algorithms, may use lower-quality motion estimation techniques. Once the encoder catches up (e.g., the time budget is no longer being exceeded), the encoder may resume encoding the content item at the first resolution and/or using the first plurality of encoding algorithms.

FIG. 1 shows an example system 100 for improved content encoding. The system 100 may comprise a plurality of computing devices/entities in communication via a network 110. The network 110 may be an optical fiber network, a coaxial cable network, a hybrid fiber-coaxial network, a wireless network, a satellite system, a direct broadcast system, an Ethernet network, a high-definition multimedia interface network, a Universal Serial Bus (USB) network, or any combination thereof. Data may be sent on the network 110 via a variety of transmission paths, including wireless paths (e.g., satellite paths, Wi-Fi paths, cellular paths, etc.) and terrestrial paths (e.g., wired paths, a direct feed source via a direct line, etc.). The network 110 may comprise public networks, private networks, wide area networks (e.g., Internet), local area networks, and/or the like. The network 110 may comprise a content access network, content distribution network, and/or the like. The network 110 may be configured to provide content from a variety of sources using a variety of network paths, protocols, devices, and/or the like. The content delivery network and/or content access network may be managed (e.g., deployed, serviced) by a content provider, a service provider, and/or the like. The network 110 may deliver content items from a source(s) to a user device(s).

The system 100 may comprise a source 102, such as a server or other computing device. The source 102 may receive source streams for a plurality of content items. The source streams may be live streams (e.g., a linear content stream) and/or video-on-demand (VOD) streams. The source 102 may receive the source streams from an external server or device (e.g., a stream capture source, a data storage device, a media server, etc.). The source 102 may receive the source streams via a wired or wireless network connection, such as the network 110 or another network (not shown).

The source 102 may comprise a headend, a video-on-demand server, a cable modem termination system, and/or the like. The source 102 may provide content (e.g., video, audio, games, applications, data) and/or content items (e.g., video, streaming content, movies, shows/programs, etc.) to user devices. The source 102 may provide streaming media, such as live content, on-demand content (e.g., video-on-demand), content recordings, and/or the like. The source 102 may be managed by third-party content providers, service providers, online content providers, over-the-top content providers, and/or the like. A content item may be provided via a subscription, by individual item purchase or rental, and/or the like. The source 102 may be configured to provide content items via the network 110. Content items may be accessed by user devices via applications, such as mobile applications, television applications, set-top box applications, gaming device applications, and/or the like. An application may be a custom application (e.g., by a content provider, for a specific device), a general content browser (e.g., a web browser), an electronic program guide, and/or the like.

The source 102 may provide uncompressed content items, such as raw video data, comprising one or more portions (e.g., frames/slices, groups of pictures (GOP), coding units (CU), coding tree units (CTU), etc.). It should be noted that although a single source 102 is shown in FIG. 1, this is not to be considered limiting. In accordance with the described techniques, the system 100 may comprise a plurality of sources 102, each of which may receive any number of source streams.

The system 100 may comprise an encoder 104, such as a video encoder, a content encoder, etc. The encoder 104 may be configured to encode one or more source streams (e.g., received via the source 102) into a plurality of content items/streams at various bit rates (e.g., various representations). For example, the encoder 402 may be configured to encode a source stream for a content item at varying bit rates for corresponding representations (e.g., versions) of a content item for adaptive bit rate streaming. As shown in FIG. 1, the encoder 402 may encode a source stream into Representations 1-5. It is to be understood that the FIG. 1 shows five representations for explanation purposes only. The encoder 104 may be configured to encode a source stream into fewer or greater representations. Representation 1 may be associated with a first resolution (e.g., 480 p) and/or a first bit rate (e.g., 4 Mbps). Representation 2 may be associated with a second resolution (e.g., 720 p) and/or a second bit rate (e.g., 5 Mbps). Representation 3 may be associated with a third resolution (e.g., 1080 p) and/or a third bit rate (e.g., 6 Mbps). Representation 4 may be associated with a fourth resolution (e.g., 4K) and/or a first bit rate (e.g., 10 Mbps). Representation 5 may be associated with a fifth resolution (e.g., 8K) and/or a fifth bit rate (e.g., 15 Mbps). Other examples resolutions and/or bit rates are possible.

The encoder 104 may be configured to determine one or more encoding parameters. The encoding parameters may be based on one or more content streams encoded by the encoder 104. For example, an encoding parameter may comprise at least one of an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like. As another example, an encoding parameter may comprise a value indicating at least one of a low complexity to encode, a medium complexity to encode, or a high complexity to encode. As a further example, an encoding parameter may comprise a transform coefficient(s), a quantization parameter value(s), a motion vector(s), an inter-prediction parameter value(s), an intra-prediction parameter value(s), a motion estimation parameter value(s), a partitioning parameter value(s), a combination thereof, and/or the like. The encoder 104 may be configured to insert encoding parameters into the content streams and/or provide encoding parameters to other devices within the system 100.

Encoding a content stream/item may comprise the encoder 104 partitioning a portion and/or frame of the content stream/item into a plurality of coding tree units (CTUs). Each of the CTUs may comprise a plurality of pixels. The CTUs may be partitioned into coding units (CUs) (e.g., coding blocks). For example, a content item may include a plurality of frames (e.g., a series of frames/pictures/portions, etc.). The plurality of frames may comprise I-frames, P-frames, and/or B-frames. An I-frame (e.g., an Intra-coded picture) may include and/or represent a complete image/picture. A P-frame (e.g., a Predicted picture/delta frame) may comprise only the changes in an image from a previous frame. For example, in a scene where a person moves across a stationary background, only the person's movements need to be encoded in a corresponding P-frame in order to indicate the change in the person's position with respect to the stationary background. To save space and computational resources, the encoder 104 may not store information/data indicating any unchanged background pixels in the P-frame. A B-frame (e.g., a Bidirectional predicted picture) may enable the encoder 104 to save more space and computational resources by storing differences between a current frame and both a preceding and a following frame. Each frame of a content item may be divided into a quantity of partitions. Each partition may comprise a plurality of pixels. Depending on a coding format (e.g., a CODEC), the partition may be a block, a macroblock, a CTU, etc. The order in which I-frames, P-frames, and B-frames are arranged is referred to herein as a Group of Pictures (GOP) structure—or simply a GOP. The encoder 104 may encode frames as open GOPs or as closed GOPs.

The system 100 may comprise a packager 106. The packager 106 may be configured to receive one or more content items/streams from the encoder 104. The packager 106 may be configured to prepare content items/streams for distribution. For example, the packager 106 may be configured to convert encoded content items/streams into a plurality of content fragments. The packager 106 may be configured to provide content items/streams according to adaptive bit rate streaming. For example, the packager 106 may be configured to convert encoded content items/streams at various representations into one or more adaptive bit rate streaming formats, such as Apple HTTP Live Streaming (HLS), Microsoft Smooth Streaming, Adobe HTTP Dynamic Streaming (HDS), MPEG DASH, and/or the like. The packager 106 may pre-package content items/streams and/or provide packaging in real-time as content items/streams are requested by user devices, such as a user device 112. The user device 112 may be a content/media player, a set-top box, a client device, a smart device, a mobile device, a user device, etc.

The system 100 may comprise a content server 108. For example, the content server 108 may be configured to receive requests for content, such as content items/streams. The content server 108 may identify a location of a requested content item and provide the content item—or a portion thereof—to a device requesting the content, such as the user device 112. The content server 108 may comprise a Hypertext Transfer Protocol (HTTP) Origin server. The content server 108 may be configured to provide a communication session with a requesting device, such as the user device 112, based on HTTP, FTP, or other protocols. The content server 108 may be one of a plurality of content server distributed across the system 100. The content server 108 may be located in a region proximate to the user device 112. A request for a content stream/item from the user device 112 may be directed to the content server 108 (e.g., due to the location and/or network conditions). The content server 108 may be configured to deliver content streams/items to the user device 112 in a specific format requested by the user device 112. The content server 108 may be configured to provide the user device 112 with a manifest file (e.g., or other index file describing portions of the content) corresponding to a content stream/item. The content server 108 may be configured to provide streaming content (e.g., unicast, multicast) to the user device 112. The content server 108 may be configured to provide a file transfer and/or the like to the user device 112. The content server 108 may cache or otherwise store content (e.g., frequently requested content) to enable faster delivery of content items to users.

Figure 2:
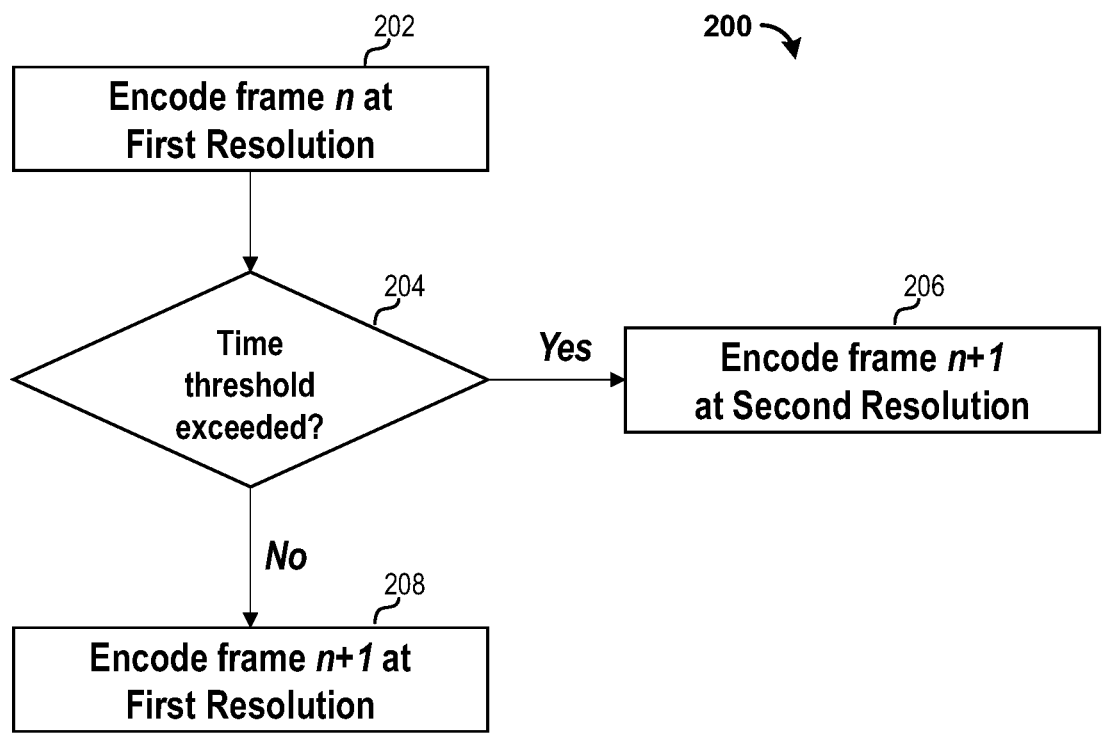
FIG. 2 shows a flowchart for an example method.
Figure 3:
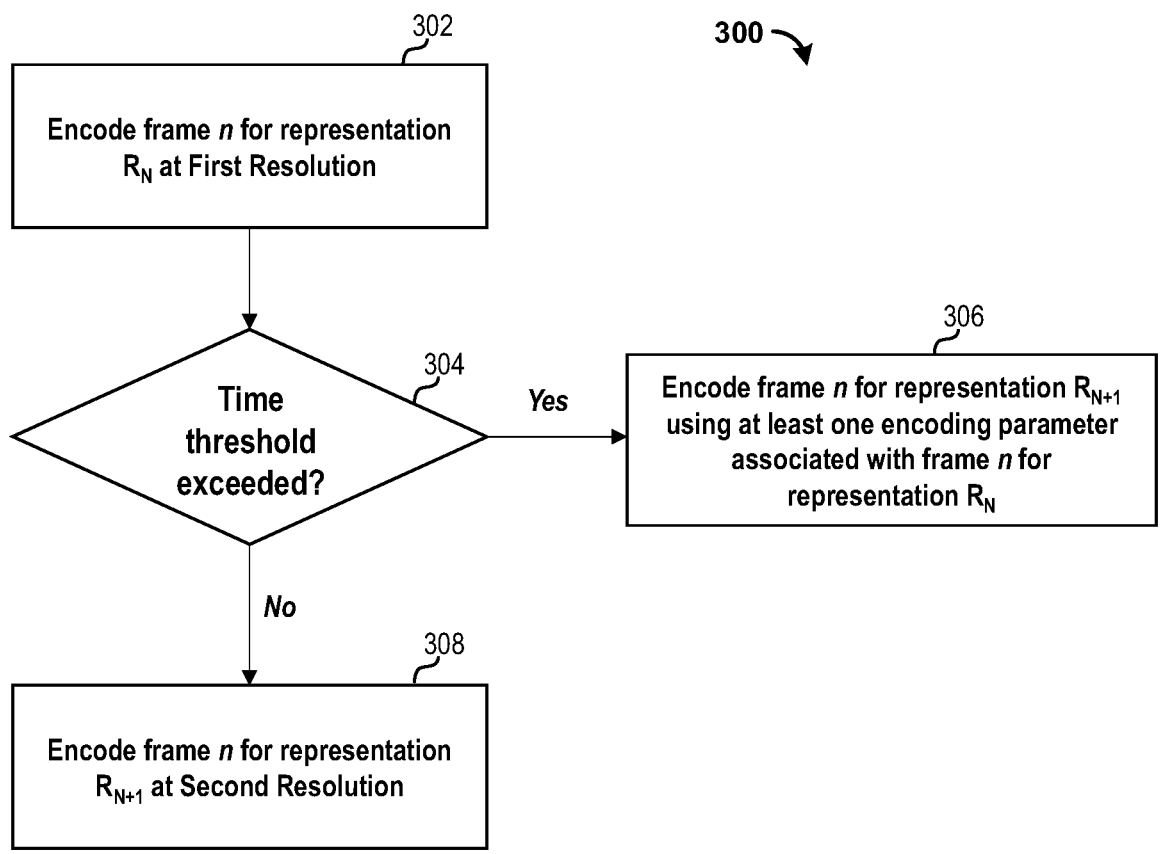
FIG. 3 shows a flowchart for an example method.
Figure 4:
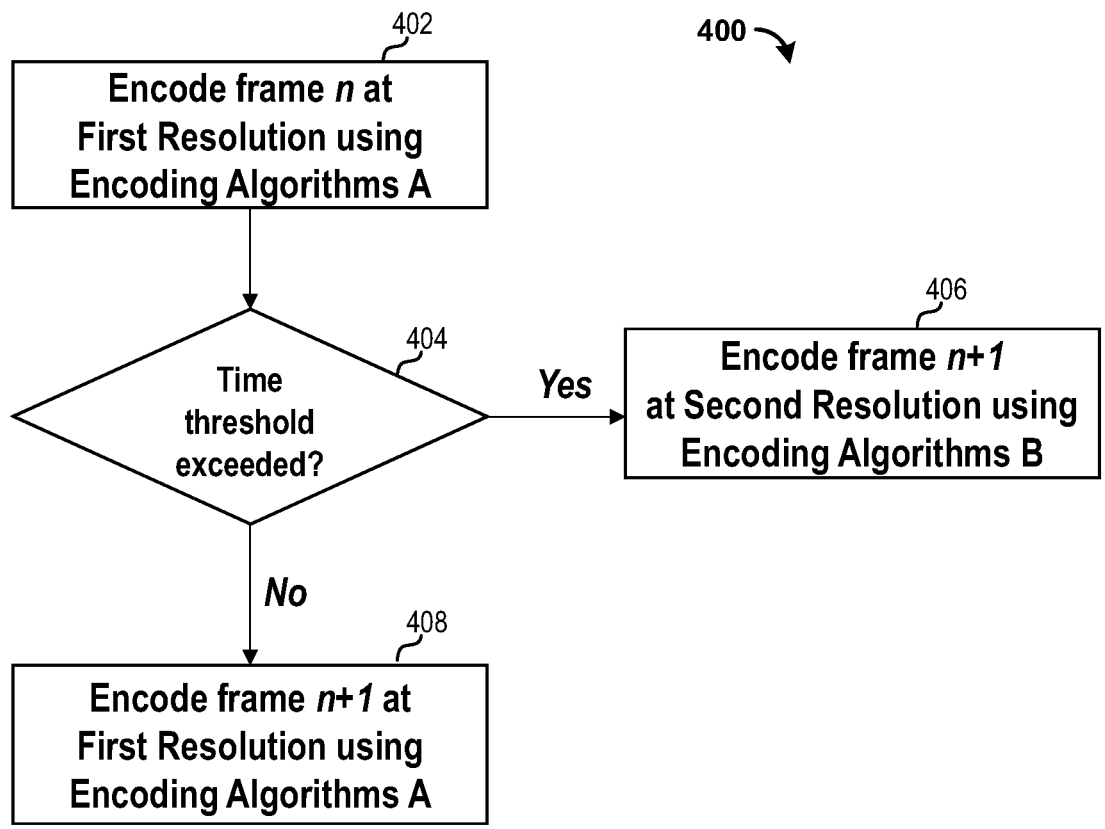
FIG. 4 shows a flowchart for an example method.

FIGS. 2-4 show flowcharts of example methods for improved content encoding that may be performed by the system 100. For example, FIG. 2 shows a flowchart for an example method 200 for adjusting an encoding level (e.g., a bitrate/resolution) in order to improve content encoding and delivery. As described herein, the encoder 104 may allocate a time budget (e.g., a "millisecond budget") for encoding each frame of a content item (e.g., a video).

At step 202, the encoder 104 may encode a first frame—or group of frames—("n") of the content item at a first resolution. At step 204, the encoder 104—or a computing device in communication with the encoder 104—may determine whether a time threshold has been exceeded. The time threshold may correspond to the time budget. For example, determining whether the time threshold has been exceeded may be based on determining whether a time required to encode frame n at step 202 is greater than the time budget. If the determination at step 204 is "yes" (e.g., the time threshold has been exceeded), then the encoder 104 may "fall behind" and become unable to deliver frames to the packager 106 at a proper time (e.g., when requested/expected by the packager 106) and the method 200 may proceed to step 206.

At step 206, the encoder 104 may encode a second frame—or group of frames—("n+1") of the content item at a second resolution (e.g., a lower resolution/bitrate). in order to allow the encoder 104 to "catch up." The encoder 104 may begin encoding at the second resolution at a GOP level, at a layer level, and/or at a single picture level. Once the encoder 104 catches up (e.g., the time budget is no longer being exceeded), the encoder 104 may resume encoding frames of the content item at the first resolution. If the determination at step 204 is "no" (e.g., the time threshold has not been exceeded), then the encoder 104 may encode frame n+1 at the first resolution at step 208.

Turning now to FIG. 3, a flowchart for an example method 300 is shown. The method 300 may utilize reference picture resampling (RPR) to improve content encoding and delivery. As described herein, frames of a content item may be encoded at multiple resolutions simultaneously. For example, the encoder 402 may be configured to encode a source stream for the content item at varying bit rates for corresponding representations (e.g., versions) of the content item for adaptive bit rate streaming. As an example, the encoder 104 may encode the source stream into Representations 1-5 (e.g., as shown in FIG. 1). Representation 1 may be associated with a first resolution (e.g., 480 p) and/or a first bit rate (e.g., 4 Mbps). Representation 2 may be associated with a second resolution (e.g., 720 p) and/or a second bit rate (e.g., 5 Mbps). Representation 3 may be associated with a third resolution (e.g., 1080 p) and/or a third bit rate (e.g., 6 Mbps). Representation 4 may be associated with a fourth resolution (e.g., 4K) and/or a first bit rate (e.g., 10 Mbps). Representation 5 may be associated with a fifth resolution (e.g., 8K) and/or a fifth bit rate (e.g., 15 Mbps). The encoded frames for each representation may be stored as a single binary (e.g., within a single storage file/structure).

At step 302, the encoder 104 may encode a first frame—or group of frames—("n") for representation $R_N$ of the content item at the first resolution (e.g., Representation 1). At step 304, the encoder 104—or a computing device in communication with the encoder 104—may determine whether a time threshold has been exceeded. The time threshold may correspond to the time budget described herein. For example, determining whether the time threshold has been exceeded may be based on determining whether an amount of time that was required to encode frame n for representation $R_N$ at step 302 is greater than the time budget.

If the determination at step 304 is "yes" (e.g., the time threshold has been exceeded), then the encoder 104 may "fall behind" and become unable to deliver frames to the packager 106 at a proper time (e.g., when requested/expected by the packager 106). If the determination at step 304 is "yes," then the method 300 may proceed to step 306.

At step 306, the encoder may use RPR to encode a frame—or group of frames—("n") for a second representation $R_{N+1}$ (e.g., Representation 1-5). For example, RPR may allow the encoder 104 to "reuse" encoding decisions when encoding the frame n for the second representation $R_{N+1}$. The encoding decisions may have been made when encoding the frame n for the representation $R_N$ at step 302. The representation $R_N$ may be associated with a lower resolution as compared to a resolution associated with the representation $R_{N+1}$. The encoding decisions may be "encoding parameters." An encoding parameter may comprise at least one of an encoding quantization level (e.g., a size of coefficient range for grouping coefficients), a predictive frame error, a relative size of an inter-coded frame with respect to an intra-coded frame, a number of motion vectors to encode in a frame, a quantizing step size (e.g., a bit precision), a combination thereof, and/or the like. As another example, an encoding parameter may comprise a value indicating at least one of a low complexity to encode, a medium complexity to encode, or a high complexity to encode. As a further example, an encoding parameter may comprise a transform coefficient(s), a quantization parameter value(s), a motion vector(s), an inter-prediction parameter value(s), an intra-prediction parameter value(s), a motion estimation parameter value(s), a partitioning parameter value(s), a combination thereof, and/or the like. RPR may therefore allow the encoder 104 to encode the frame n for the second representation $R_{N+1}$ using less computational resources, since the encoding decisions (e.g., encoding parameters) made when encoding the frame n for the representation $R_N$ are able to be "reused" when encoding the frame n for the second representation $R_{N+1}$.

The encoder 106 may use RPR at step 306 when the frame n for the representation $R_N$ and the frame n for the representation $R_{N+1}$ share one or more encoding characteristics. For example, the frame n for the representation $R_N$ and the frame n for the representation $R_{N+1}$ may comprise a same frame type. As another example, the frame n for the representation $R_N$ and the frame n for the representation $R_{N+1}$ may each be associated with a same reference frame(s). As a further example, the frame n for the representation $R_N$ and the frame n for the representation $R_{N+1}$ may each be associated with a same downsampling filter(s).

Once the encoder 104 catches up (e.g., the time budget is no longer being exceeded), the encoder 104 may begin encoding frames for the representation $R_{N+1}$ at a higher resolution as compared to the representation $R_N$. Additionally, if the determination at step 304 is "no" (e.g., the time threshold has not been exceeded), then the method 300 may proceed directly to step 308. At step 308, the encoder 104 may encode the frame n for the representation $R_{N+1}$ at a higher resolution as compared to the representation $R_N$.

FIG. 4 shows a flowchart for an example method 400 for adjust an encoding level (e.g., a bitrate/resolution) and reducing computational complexity in order to improve content encoding and delivery. At step 402, the encoder 104 may encode a first frame—or group of frames—("n") of the content item at a first resolution using a first plurality of encoding algorithms. The first plurality of encoding algorithms may be used to determine encoding decisions (e.g., encoding parameters), such as an encoding quantization level, a predictive frame error, a relative size of an inter-coded frame with respect to an intra-coded frame, a number of motion vectors to encode in a frame, a quantizing step size, a transform coefficient(s), a motion vector(s), an inter-prediction parameter value(s), an intra-prediction parameter value(s), a motion estimation parameter value(s), a partitioning parameter value(s), a combination thereof, and/or the like.

At step 404, the encoder 104—or a computing device in communication with the encoder 104—may determine whether a time threshold has been exceeded. The time threshold may correspond to the time budget. For example, determining whether the time threshold has been exceeded may be based on determining whether a time required to encode frame n at step 402 is greater than the time budget. If the determination at step 404 is "yes" (e.g., the time threshold has been exceeded), then the encoder 104 may "fall behind" and become unable to deliver frames to the packager 106 at a proper time (e.g., when requested/expected by the packager 106) and the method 400 may proceed to step 406. At step 406, the encoder 104 may encode a second frame—or group of frames—("n+1") of the content item at a second resolution (e.g., a lower resolution/bitrate) using a second plurality of encoding algorithms in order to allow the encoder 104 to "catch up."

The second plurality of encoding algorithms may be used to determine encoding decisions (e.g., encoding parameters), such as an encoding quantization level, a predictive frame error, a relative size of an inter-coded frame with respect to an intra-coded frame, a number of motion vectors to encode in a frame, a quantizing step size, a transform coefficient(s), a motion vector(s), an inter-prediction parameter value(s), an intra-prediction parameter value(s), a motion estimation parameter value(s), a partitioning parameter value(s), a combination thereof, and/or the like. The second plurality of encoding algorithms, as compared to the first plurality of encoding algorithms, may require less computational demand. For example, the second plurality of encoding algorithms, as compared to the first plurality of encoding algorithms, may use a lesser number reference frames. As another example, the second plurality of encoding algorithms, as compared to the first plurality of encoding algorithms, may perform a lesser number of rate-distortion optimizations. As a further example, the second plurality of encoding algorithms, as compared to the first plurality of encoding algorithms, may use lower-quality motion estimation techniques.

The encoder 104 may begin encoding frame n+1 at the second resolution using the second plurality of encoding algorithms at a GOP level, at a layer level, and/or at a single picture level. Once the encoder 104 catches up (e.g., the time budget is no longer being exceeded), the encoder 104 may resume encoding frames of the content item at the first resolution using the first plurality of encoding algorithms. Additionally, if the determination at step 404 is "no" (e.g., the time threshold has not been exceeded), then the encoder 104 may encode frame n+1 at the first resolution at step 408 using the first plurality of encoding algorithms.

While the description herein refers to the encoder 104 encoding entire frames of content items, it is to be understood that the functionality of the encoder 104 may equally apply to a portion of a frame rather than an entire frame. A portion of a frame, as described herein, may comprise one or more coding tree units/blocks (CTUs), one or more coding units/blocks (CUs), a combination thereof, and/or the like. For example, with respect to the method 200, the encoder 104 may allocate a time budget for encoding at least a portion of each frame of the content item. When the 104 encoder takes longer than the allocated time budget to encode at least a portion of a given frame(s) of the content item at the first resolution, the encoder may begin to encode frames of the content item—or portions thereof—at the second resolution (e.g., a lower resolution/bitrate) in order to allow the encoder to "catch up." As another example, with respect to the method 300, when the encoder 104 takes longer than the allocated time budget to encode at least a portion of at least one frame for the first representation of the content item at the first resolution, the encoder 104 may use RPR when encoding further frames—or portions thereof—for the first representation. The encoder 104 may use RPR to "reuse" encoding decisions for corresponding frames that were previously encoded for the second representation at the second resolution. As a further example, with respect to the method 400, when the encoder 104 the takes longer than the allocated time budget to encode at least a portion of a given frame(s) of the content item at the first resolution using the first plurality of encoding algorithms, the encoder 104 may begin to encode frames of the content item—or portions thereof—at the second resolution using the second plurality of encoding algorithms.

Figure 5:
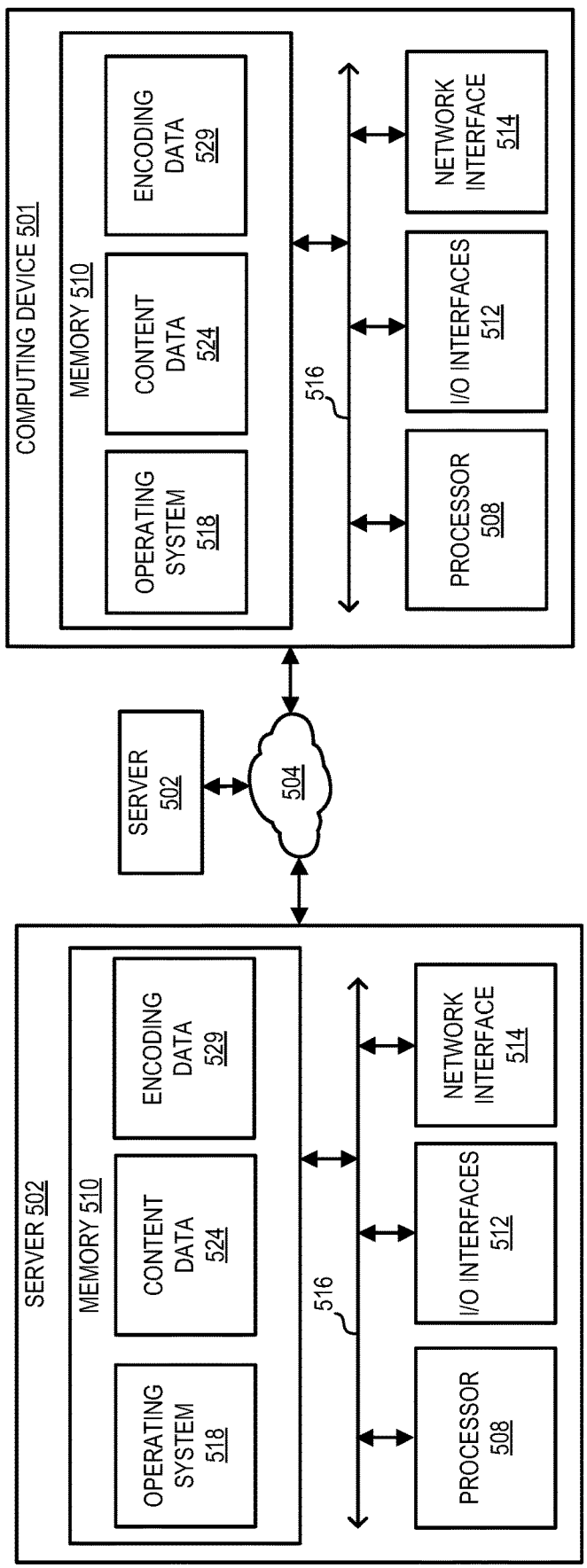
FIG. 5 shows an example system.

The present methods and systems may be computer-implemented. FIG. 5 shows a block diagram depicting a system/environment 500 comprising non-limiting examples of a computing device 501 and a server 502 connected through a network 504. Either of the computing device 501 or the server 502 may be a computing device, such as any of the devices of the system 100 shown in FIG. 1. In an aspect, some or all steps of any described method may be performed on a computing device as described herein. The computing device 501 may comprise one or multiple computers configured to store encoding data 529, and/or the like. The server 502 may comprise one or multiple computers configured to store content data 524 (e.g., a plurality of content segments). Multiple servers 502 may communicate with the computing device 501 via the through the network 504.

The computing device 501 and the server 502 may be a digital computer that, in terms of hardware architecture, generally includes a processor 508, system memory 510, input/output (I/O) interfaces 512, and network interfaces 514. These components (508, 510, 512, and 514) are communicatively coupled via a local interface 516. The local interface 516 may be, for example, but not limited to, one or more buses or other wired or wireless connections, as is known in the art. The local interface 516 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 508 may be a hardware device for executing software, particularly that stored in system memory 510. The processor 508 may be any custom made or commercially available processor, a central processing unit (CPU), an auxiliary processor among several processors associated with the computing device 501 and the server 502, a semiconductor-based microprocessor (in the form of a microchip or chip set), or generally any device for executing software instructions. When the computing device 501 and/or the server 502 is in operation, the processor 508 may execute software stored within the system memory 510, to communicate data to and from the system memory 510, and to generally control operations of the computing device 501 and the server 502 pursuant to the software.

The I/O interfaces 512 may be used to receive user input from, and/or for providing system output to, one or more devices or components. User input may be provided via, for example, a keyboard and/or a mouse. System output may be provided via a display device and a printer (not shown). I/O interfaces 512 may include, for example, a serial port, a parallel port, a Small Computer System Interface (SCSI), an infrared (IR) interface, a radio frequency (RF) interface, and/or a universal serial bus (USB) interface.

The network interface 514 may be used to transmit and receive from the computing device 501 and/or the server 502 on the network 504. The network interface 514 may include, for example, a 10BaseT Ethernet Adaptor, a 10BaseT Ethernet Adaptor, a LAN PHY Ethernet Adaptor, a Token Ring Adaptor, a wireless network adapter (e.g., WiFi, cellular, satellite), or any other suitable network interface device. The network interface 514 may include address, control, and/or data connections to enable appropriate communications on the network 504.

The system memory 510 may include any one or combination of volatile memory elements (e.g., random access memory (RAM, such as DRAM, SRAM, SDRAM, etc.)) and nonvolatile memory elements (e.g., ROM, hard drive, tape, CDROM, DVDROM, etc.). Moreover, the system memory 510 may incorporate electronic, magnetic, optical, and/or other types of storage media. Note that the system memory 510 may have a distributed architecture, where various components are situated remote from one another, but may be accessed by the processor 508.

The software in system memory 510 may include one or more software programs, each of which comprises an ordered listing of executable instructions for implementing logical functions. In the example of FIG. 5, the software in the system memory 510 of the computing device 501 may comprise the encoding data 529, the content data 524, and a suitable operating system (O/S) 518. In the example of FIG. 5, the software in the system memory 510 of the server 502 may comprise the encoding data 529, the content data 524, and a suitable operating system (O/S) 518. The operating system 518 essentially controls the execution of other computer programs and provides scheduling, input-output control, file and data management, memory management, and communication control and related services.

For purposes of illustration, application programs and other executable program components such as the operating system 518 are shown herein as discrete blocks, although it is recognized that such programs and components may reside at various times in different storage components of the computing device 501 and/or the server 502. An implementation of the system/environment 500 may be stored on or transmitted across some form of computer readable media. Any of the disclosed methods may be performed by computer readable instructions embodied on computer readable media. Computer readable media may be any available media that may be accessed by a computer. By way of example and not meant to be limiting, computer readable media may comprise "computer storage media" and "communications media." "Computer storage media" may comprise volatile and non-volatile, removable and non-removable media implemented in any methods or technology for storage of information such as computer readable instructions, data structures, program modules, or other data. Exemplary computer storage media may comprise RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer.

Figure 6:
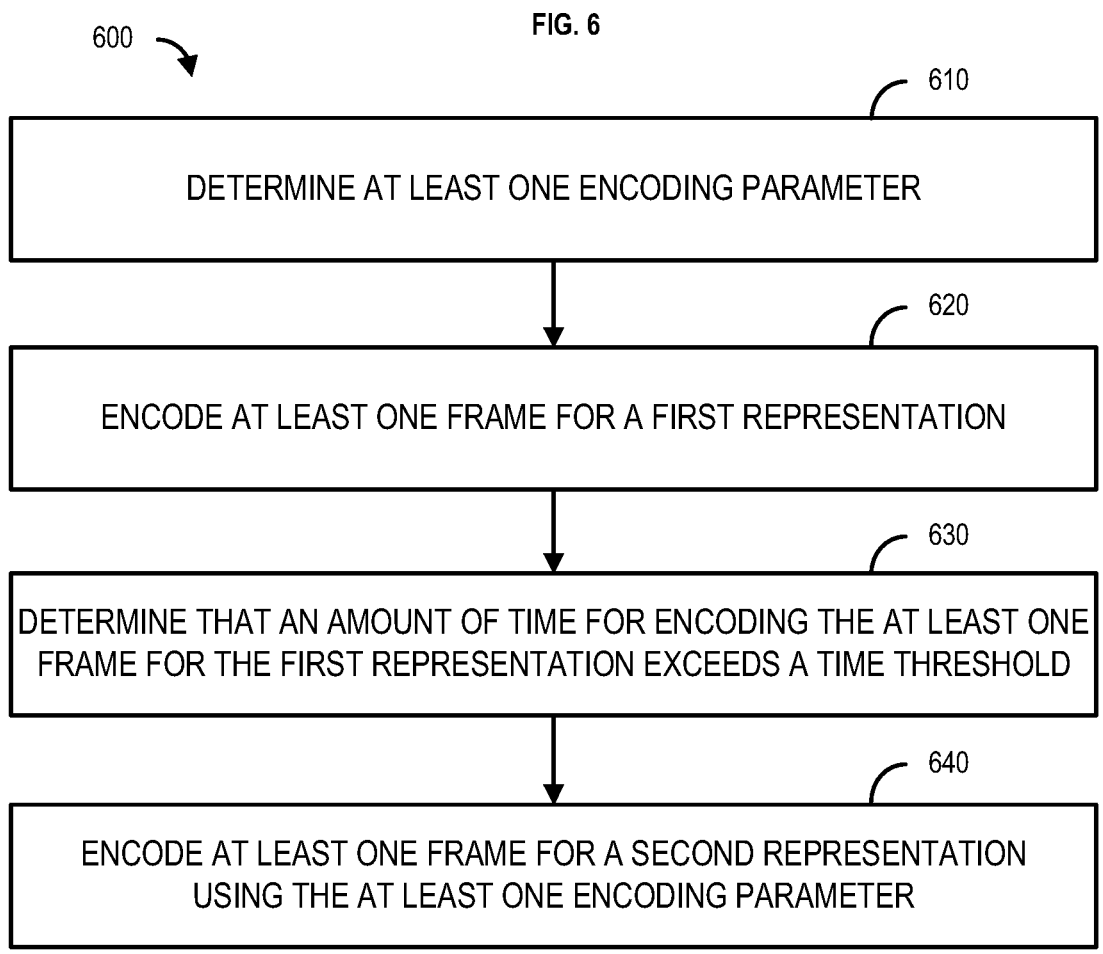
FIG. 6 shows a flowchart for an example method.

FIG. 6 shows a flowchart of an example method 600 for improved encoding and content delivery. The method 600 may be performed in whole or in part by a single computing device, a plurality of computing devices, and the like. For example, the steps of the method 600 may be performed the encoder 104 shown in FIG. 1 and/or a computing device in communication with the encoder 104. Some steps of the method 600 may be performed by a first computing device (e.g., the encoder 104), while other steps of the method 600 may be performed by another computing device.

The computing device may be configured to encode frames of a content item at multiple resolutions simultaneously. For example, the computing device may encode a source stream for the content item at varying bit rates for corresponding representations (e.g., versions) of the content item for adaptive bit rate streaming (e.g., Representations 1-5 shown in FIG. 1). A first representation (e.g., Representation 1 in FIG. 1 and/or Representation $R_N$ described herein) may be associated with a first resolution (e.g., 720 p) and/or a first bit rate (e.g., 5 Mbps). A second representation (e.g., Representation 2 in FIG. 1 and/or Representation $R_{N+1}$ described herein) may be associated with a second resolution (e.g., 480 p) and/or a second bit rate (e.g., 4 Mbps). The computing device may encode the content item for additional representations, however, for purposes of explanation, the method 600 will describe two representations. The encoded frames for each representation may be stored as a single binary (e.g., within a single storage file/structure).

At step 610, the computing device may determine at least one encoding parameter. The at least one encoding parameter may be an encoding decision(s) for at least one frame—or a portion thereof—of a plurality of frames of the content item. The plurality of frames may comprise a group of pictures (GOP) structure. The encoding decision may be associated with encoding at least a portion of the at least one frame for the first representation at the first resolution. The at least one encoding parameter may comprise at least one of an encoding quantization level (e.g., a size of coefficient range for grouping coefficients) for the at least one portion of the at least one frame for the first representation; a predictive frame error for the at least one portion of the at least one frame for the first representation; a relative size of an inter-coded frame with respect to an intra-coded frame; a number of motion vectors to encode in the at least one portion of the at least one frame for the first representation; a quantizing step size (e.g., a bit precision) for the at least one portion of the at least one frame for the first representation; a combination thereof, and/or the like. As another example, the at least one encoding parameter may comprise a value indicating at least one of a low complexity to encode, a medium complexity to encode, or a high complexity to encode. As a further example, the at least one encoding parameter may comprise a transform coefficient(s) for the at least one portion of the at least one frame for the first representation; a quantization parameter value(s) for the at least one portion of the at least one frame for the first representation; a motion vector(s) for the at least one portion of the at least one frame for the first representation; an inter-prediction parameter value(s) for the at least one portion of the at least one frame for the first representation; an intra-prediction parameter value(s) for the at least one portion of the at least one frame for the first representation; a motion estimation parameter value(s) for the at least one portion of the at least one frame for the first representation; a partitioning parameter value(s) for the at least one portion of the at least one frame for the first representation; a combination thereof, and/or the like.

At step 620, the computing device may encode the at least one portion of at least one frame for the first representation.

For example, the computing device may encode the at least one portion of the at least one frame for the first representation based on the at least on encoding parameter. The first representation and/or the first bit rate may be associated with a lower resolution and/or lower bit rate as compared to the second representation and/or the second bit rate, respectively. At step 630, the computing device may determine that an amount of time associated with encoding the at least one portion of the at least one frame for the first representation exceeds a time threshold. The time threshold may correspond to a time budget. For example, the time budget may comprise an expected amount of time (e.g., an amount of milliseconds) for encoding at least one portion of any of the plurality of frames for the first representation. The amount of time associated with encoding the at least one portion of the at least one frame for the first representation may exceed the time threshold when the amount of time exceeds the time budget.

At step 640, the computing device may encode at least one portion of at least one frame of the plurality of frames for the second representation. For example, in response to the amount of time associated with encoding the at least one portion of the at least one frame for the first representation exceeding the time threshold, the computing device may use reference picture resampling (RPR) as described herein to encode the at least one portion of the at least one frame for the second representation. RPR may allow the computing device to "reuse" at least one encoding parameter when encoding the at least one portion of the at least one frame for the second representation.

The computing device may use RPR at step 640 when the at least one portion of the at least one frame for the first representation and the at least one portion of the at least one frame for the second representation share one or more encoding characteristics. For example, the at least one portion of the at least one frame for the first representation and the at least one portion of the at least one frame for the second representation may comprise a same frame type. As another example, the at least one portion of the at least one frame for the first representation and the at least one portion of the at least one frame for the second representation may each be associated with a same reference frame(s). As a further example, the at least one portion of the at least one frame for the first representation and the at least one portion of the at least one frame for the second representation may each be associated with a same downsampling filter(s).

The computing device may use RPR at step 640 when the one or more encoding characteristics shared between the at least one portion of the at least one frame for the first representation and the at least one portion of the at least one frame for the second representation meet or exceed a weight threshold. For example, the one or more encoding characteristics may be a frame type as described above. The frame type associated with the at least one portion of the at least one frame for the first representation may comprise a first reference frame type, such as a P-frame. The weight threshold may not be met or exceeded when the frame type comprises the first reference frame type. As another example, the frame type associated with the at least one frame for the first representation may comprise a second reference frame type, such as a B-frame. The weight threshold may be met or exceeded when the frame type comprises the second reference frame type.

Figure 7:
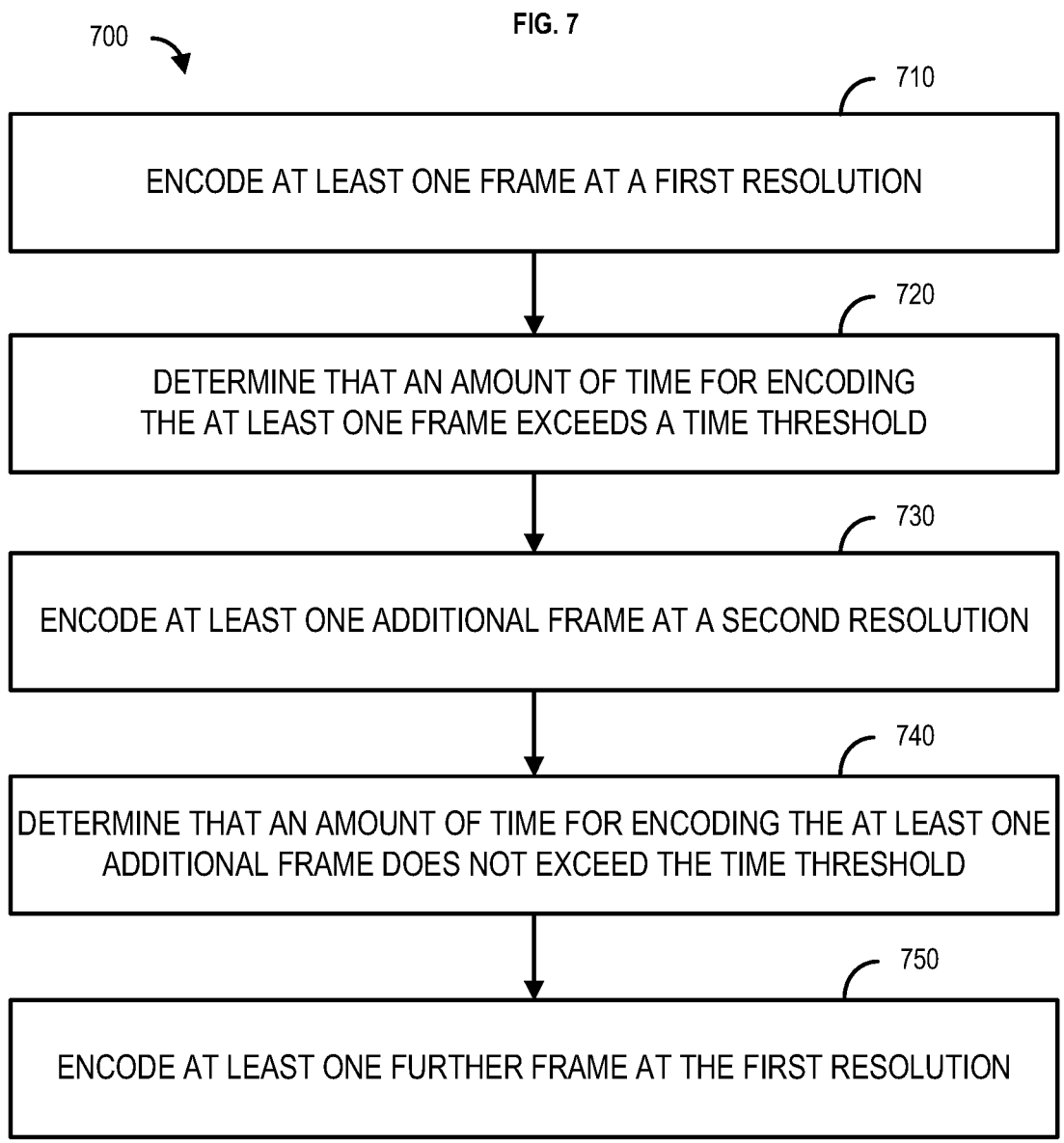
FIG. 7 shows a flowchart for an example method.

FIG. 7 shows a flowchart of an example method 700 for improved encoding and content delivery. The method 700 may be performed in whole or in part by a single computing device, a plurality of computing devices, and the like. For example, the steps of the method 700 may be performed the encoder 104 shown in FIG. 1 and/or a computing device in communication with the encoder 104. Some steps of the method 700 may be performed by a first computing device (e.g., the encoder 104), while other steps of the method 700 may be performed by another computing device.

The computing device may be configured to encode frames—or portions thereof—of a content item. For example, the computing device may encode a source stream for the content item. The computing device may determine at least one encoding parameter. The at least one encoding parameter may be an encoding decision(s) for at least a portion of at least one frame of a plurality of frames of the content item. The plurality of frames may comprise a group of pictures (GOP) structure. The encoding decision may be associated with encoding the at least one portion of the at least one frame at the first resolution.

The at least one encoding parameter may comprise at least one of an encoding quantization level (e.g., a size of coefficient range for grouping coefficients) for the at least one frame—or a portion thereof, a predictive frame error for the at least one frame—or a portion thereof, a relative size of an inter-coded frame—or a portion thereof—with respect to an intra-coded frame—or a portion thereof, a number of motion vectors to encode in the at least one frame—or a portion thereof, a quantizing step size (e.g., a bit precision) for the at least one frame—or a portion thereof, a combination thereof, and/or the like. As another example, the at least one encoding parameter may comprise a value indicating at least one of a low complexity to encode, a medium complexity to encode, or a high complexity to encode. As a further example, the at least one encoding parameter may comprise a transform coefficient(s) for the at least one frame—or a portion thereof; a quantization parameter value(s) for the at least one frame—or a portion thereof; a motion vector(s) for the at least one frame—or a portion thereof; an inter-prediction parameter value(s) for the at least one frame—or a portion thereof; an intra-prediction parameter value(s) for the at least one frame—or a portion thereof; a motion estimation parameter value(s) for the at least one frame—or a portion thereof; a partitioning parameter value(s) for the at least one frame—or a portion thereof; a combination thereof, and/or the like.

At step 710, the computing device may encode the at least one frame—or a portion thereof—at the first resolution. For example, the computing device may encode the at least one frame—or a portion thereof—at the first resolution based on the at least on encoding parameter. The first resolution may be associated with a higher bitrate as compared to a second resolution. At step 720, the computing device may determine that a first amount of time associated with encoding the at least one frame—or a portion thereof—at the first resolution exceeds a time threshold. The time threshold may correspond to a time budget. For example, the time budget may comprise an expected amount of time (e.g., an amount of milliseconds) for encoding any of the plurality of frames—or a portion thereof—for at the first resolution. The first amount of time may exceed the time threshold when the amount of time exceeds the time budget.

At step 730, the computing device may encode at least one additional frame—or a portion thereof—of the plurality of frames at a second resolution. The computing device may encode the at least one additional frame—or a portion thereof—at the second resolution in response to the first amount of time associated with encoding the at least one frame—or a portion thereof—at the first resolution exceeding the time threshold. The at least one frame and the at least one additional frame may at a same position within the plurality of frames or they may be at successive positions with the plurality of frames. When the at least one frame and the at least one additional frame are at the same position within the plurality of frames, the computing device may use reference picture resampling (RPR) as described herein to encode the at least one additional frame at the second resolution. RPR may allow the computing device to "reuse" the at least one encoding parameter when encoding the at least one additional frame at the second resolution. The computing device may encode the at least one additional frame at the second resolution at a GOP level, at a layer level, and/or at a single picture level.

At step 740, the computing device may determine that a second amount of time associated with encoding the at least one additional frame—or a portion thereof—at the second resolution does not exceed the time threshold. The second amount of time may not exceed the time threshold when the second amount of time is less than or equal to the time budget and/or the time threshold. The computing device may encode frames—or portions thereof—at the second resolution until it "catches up" (e.g., the time threshold is no longer being exceeded). At step 750, based on the second amount of time being less than or equal to the time threshold, the computing device may encode at least one further frame—or a portion thereof—of the plurality of frames at the first resolution. The at least one further frame and the at least one additional frame may at a same position within the plurality of frames or they may be at successive positions with the plurality of frames.

Figure 8:
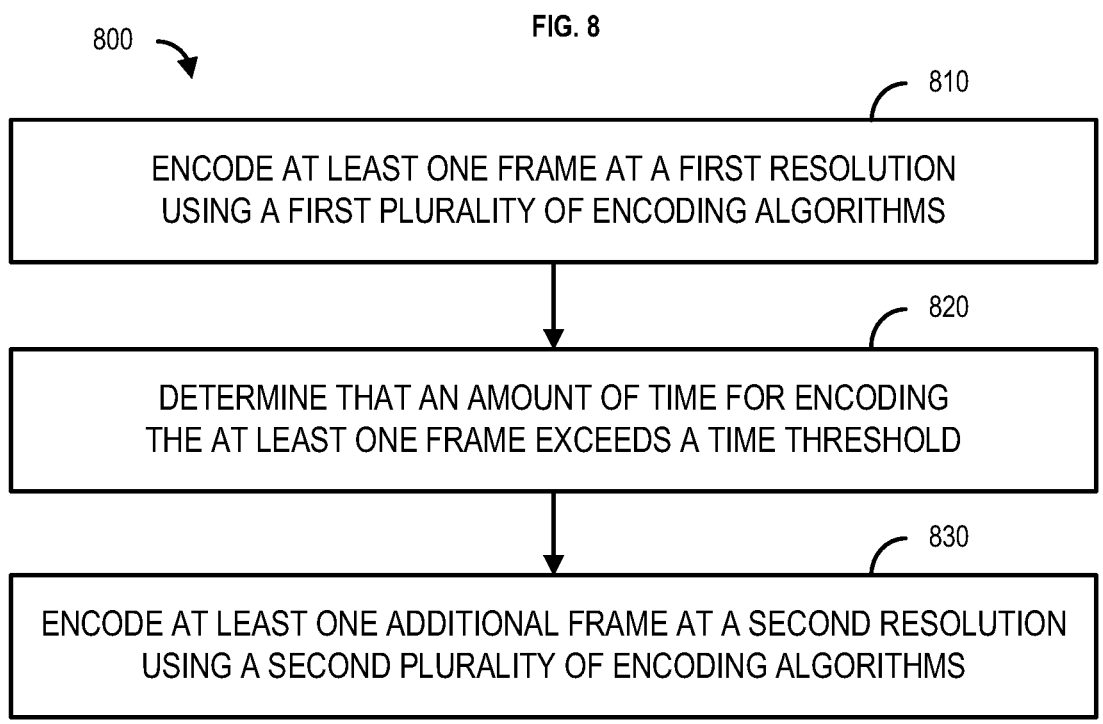
FIG. 8 shows a flowchart for an example method.

FIG. 8 shows a flowchart of an example method 800 for improved encoding and content delivery. The method 800 may be performed in whole or in part by a single computing device, a plurality of computing devices, and the like. For example, the steps of the method 800 may be performed the encoder 104 shown in FIG. 1 and/or a computing device in communication with the encoder 104. Some steps of the method 800 may be performed by a first computing device (e.g., the encoder 104), while other steps of the method 800 may be performed by another computing device. While the description herein refers to the first computing device encoding entire frames of content items, it is to be understood that the functionality of the first computing device may equally apply to a portion of a frame rather than an entire frame. For example, when the first computing device the takes longer than an allocated time budget to encode at least a portion of a given frame(s) of a content item at a first resolution using a first plurality of encoding algorithms, the first computing device may begin to encode frames of the content item—or portions thereof—at a second resolution using a second plurality of encoding algorithms.

The computing device may be configured to encode frames—or portions thereof—of a content item. For example, the computing device may encode a source stream for the content item. At step 810, the computing device may encode at least one frame of a plurality of frames of the content item at a first resolution using a first plurality of encoding algorithms. The plurality of frames may comprise a group of pictures (GOP) structure. The first plurality of encoding algorithms may be used to determine encoding decisions (e.g., encoding parameters), such as an encoding quantization level, a predictive frame error, a relative size of an inter-coded frame with respect to an intra-coded frame, a number of motion vectors to encode in a frame, a quantizing step size, a transform coefficient(s), a motion vector(s), an inter-prediction parameter value(s), an intra-prediction parameter value(s), a motion estimation parameter value(s), a partitioning parameter value(s), a combination thereof, and/or the like.

At step 820, the computing device may determine that an amount of time for encoding the at least one frame exceeds a time threshold. The time threshold may correspond to a time budget. For example, the time budget may comprise an expected amount of time (e.g., an amount of milliseconds) for encoding any of the plurality of frames for at the first resolution using the first plurality of encoding algorithms. The amount of time may exceed the time threshold when the amount of time exceeds the time budget. At step 830, the computing device may encode at least one additional frame of the plurality of frames of the content item at a second resolution (e.g., a lower resolution/bitrate) using a second plurality of encoding algorithms.

The second plurality of encoding algorithms may be used to determine encoding decisions (e.g., encoding parameters), such as an encoding quantization level, a predictive frame error, a relative size of an inter-coded frame with respect to an intra-coded frame, a number of motion vectors to encode in a frame, a quantizing step size, a transform coefficient(s), a motion vector(s), an inter-prediction parameter value(s), an intra-prediction parameter value(s), a motion estimation parameter value(s), a partitioning parameter value(s), a combination thereof, and/or the like. The second plurality of encoding algorithms, as compared to the first plurality of encoding algorithms, may require less computational demand. For example, the second plurality of encoding algorithms, as compared to the first plurality of encoding algorithms, may use a lesser number reference frames. As another example, the second plurality of encoding algorithms, as compared to the first plurality of encoding algorithms, may perform a lesser number of rate-distortion optimizations. As a further example, the second plurality of encoding algorithms, as compared to the first plurality of encoding algorithms, may use lower-quality motion estimation techniques.

The computing device may encode the at least one additional frame at the second resolution using the second plurality of encoding algorithms at a GOP level, at a layer level, and/or at a single picture level. The computing device may encode frames at the second resolution using the second plurality of encoding algorithms until it "catches up" (e.g., the time threshold is no longer being exceeded). The computing device may resume encoding further frames of the plurality of frames at the first resolution using the first plurality of encoding algorithms when the time threshold is no longer exceeded.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

The invention claimed is:

1. A method comprising:
   determining, by a computing device, based on at least one frame of a plurality of frames, for a first representation of a content item, at least one encoding parameter for encoding at least a portion of the at least one frame for the first representation at a first resolution;
   encoding the at least one frame for the first representation using the at least one encoding parameter, wherein the first representation is associated with the first resolution;
   determining that an amount of time associated with encoding at least the portion of the at least one frame for the first representation is greater than an expected amount of time for encoding at least a portion of any frame, of the plurality of frames, at the first resolution; and
   based on the amount of time being greater than the expected amount of time, encoding at least one frame, of the plurality of frames, for a second representation of the content item using the at least one encoding parameter, wherein the second representation is associated with a second resolution that differs from the first resolution.

2. The method of claim 1, wherein the first resolution is lower than the second resolution.

3. The method of claim 1, wherein the first representation is associated with a first bit rate, wherein the second representation is associated with a second bit rate, and wherein the first bit rate is less than the second bit rate.

4. The method of claim 1, wherein the expected amount of time comprises an allocated time budget associated with at least one of: the computing device or an encoding device associated with encoding at least a portion of any frame, of the plurality of frames, at the first resolution.

5. The method of claim 1, wherein the plurality of frames comprises a group of pictures structure.

6. The method of claim 1, wherein encoding the at least one frame for the second representation comprises:
   determining, based on a frame type associated with the at least one frame for the first representation, and based on a weight associated with the frame type, that the at least one frame for the second representation is to be encoded for the second representation based on the at least one encoding parameter, wherein the frame type comprises a non-reference frame.

7. The method of claim 1, wherein the at least one encoding parameter comprises an intra-prediction parameter, a motion estimation parameter, or a partitioning parameter.

8. A method comprising:
   encoding, by a computing device, using at least one encoding parameter, at least one frame of a plurality of frames of a content item, at a first resolution;
   determining that a first amount of time associated with encoding at least a portion of the at least one frame at the first resolution is greater than an expected amount of time for encoding at least a portion of any frame, of the plurality of frames, at the first resolution;
   encoding, based on the first amount of time being greater than the expected amount of time, at least one additional frame of the plurality of frames at a second resolution using the at least one encoding parameter;
   determining that a second amount of time associated with encoding at least a portion of the at least one additional frame at the second resolution is less than or equal to the expected amount of time; and
   encoding, based on the second amount of time being less than or equal to the expected amount of time, at least one further frame of the plurality of frames at the first resolution.

9. The method of claim 8, wherein the first resolution comprises a higher bitrate than the second resolution.

10. The method of claim 8, wherein the expected amount of time comprises an allocated time budget associated with at least one of: the computing device or an encoding device associated with encoding at least a portion of any frame, of the plurality of frames, at the first resolution.

11. The method of claim 8, wherein the plurality of frames comprises a group of pictures structure.

12. The method of claim 8, wherein encoding the at least one further frame at the first resolution comprises encoding, using the at least one encoding parameter, the at least one further frame at the first resolution.

13. The method of claim 8, wherein the at least one encoding parameter comprises an intra-prediction parameter, a motion estimation parameter, or a partitioning parameter associated with the at least one further frame.

14. The method of claim 8, wherein the at least one encoding parameter comprises an intra-prediction parameter, a motion estimation parameter, or a partitioning parameter associated with the at least one frame.

15. A method comprising:
   encoding, by a computing device, using a first plurality of encoding algorithms associated with a first resolution, at least one frame of a plurality of frames within a group of pictures (GOP) structure of a content item;
   determining that an amount of time associated with encoding at least a portion of the at least one frame is greater than an expected amount of time for encoding at least a portion of any frame, of the plurality of frames, at the first resolution; and
   based on the amount of time being greater than the expected amount of time, encoding, using a second plurality of encoding algorithms associated with a second resolution, at least one additional frame of the plurality of frames within the GOP structure.

16. The method of claim 15, wherein the first resolution comprises a higher bitrate than the second resolution.

17. The method of claim 15, wherein the expected amount of time comprises an allocated time budget associated with at least one of: the computing device or an encoding device associated with encoding at least a portion of any frame, of the plurality of frames, at the first resolution.

18. The method of claim 15, wherein the second plurality of encoding algorithms are associated with a lower amount of computational complexity than the first plurality of encoding algorithms.

19. The method of claim 15, wherein the first plurality of encoding algorithms comprises at least one of: a first plurality of reference frames, a first plurality of rate-distortion optimizations, or a first level of motion estimation, and wherein the second plurality of encoding algorithms comprises at least one of: a second plurality of reference frames, a second plurality of rate-distortion optimizations, or a second level of motion estimation.

20. The method of claim 19, wherein the second plurality of reference frames is less than the first plurality of reference frames, the second plurality of rate-distortion optimizations is less than the first plurality of rate-distortion optimizations, and the second level of motion estimation is less than the first level of motion estimation.

\* \* \* \* \*